Dec. 27, 1960 P. W. WADSWORTH 2,966,553

MULTIPARTY TELEPHONE SYSTEM

Filed Nov. 30, 1954 2 Sheets-Sheet 1

INVENTOR
P. W. WADSWORTH
BY [signature]
ATTORNEY

Dec. 27, 1960 P. W. WADSWORTH 2,966,553

MULTIPARTY TELEPHONE SYSTEM

Filed Nov. 30, 1954 2 Sheets-Sheet 2

INVENTOR
P. W. WADSWORTH
BY
ATTORNEY 2,966,553

MULTIPARTY TELEPHONE SYSTEM

Paul W. Wadsworth, Garden City, N.Y., assignor to Bell Telephone Laboratories, Incorporated, New York, N.Y., a corporation of New York Filed Nov. 30, 1954, Ser. No. 472,003

9 Claims. (Cl. 179—17)

This invention relates to telephone systems and more particularly to improvements in such systems for identifying calling stations on multiparty lines.

In order to insure the proper assessment of service charges, it is necessary that means be provided in party line systems for determining the identity of calling parties. A number of arrangements are known in the prior art for providing such identification in accordance with an individual characteristic of the calling device or dial operation at a calling subscriber's station. These arrangements may include the transmission of a special code, alternating current impulses or alternating current signals of distinct frequency from the subscriber's station to the central office. As the equipment necessary to provide this information generally adds undesirable bulk and expense to the subscriber station, the problem of providing reliable identification information at reasonable cost and equipment size has increased in importance with the steadily expanding use of customer toll dialing on multiparty lines.

It is an object of this invention to provide improved means for party identification in telephone systems. More specifically, it is an object of this invention to provide an improved arrangement for automatically identifying the calling subscriber on multiparty lines in such telephone systems.

It is another object of this invention to provide such party identification arrangements which utilize circuit elements of compact size, economical construction and low current consumption.

It is a further object of this invention to provide a substation circuit for generating party identification signals employing components which are also utilized in the normal operation of the station telephone set.

It is a still further object of this invention to enable operation of such a party identification circuit under the control of the dial off normal conditions to avoid interference with the normal operation of the station telephone set.

These and other objects are realized in one specific illustrative embodiment of this invention in which a transistor oscillator is located at each subscriber station for automatically providing calling subscriber identification signals on multiparty lines. Each station oscillator on the multiparty line operates at a different frequency, which advantageously may be in the voice band, with frequency separation being sufficient to permit detection and identification at the central office.

In accordance with one aspect of the invention, economy and space conservation are achieved by employing the induction coil normally present in the station set as the inductive element in the tuned circuit of the transistor oscillator. Advantageously, the induction coil is switched from its normal connections in the subset speech circuit to a position in the transistor oscillator circuit at the same time the receiver is switched out of the circuit, advantageously by the same switching means, so that there will be no interference with the normal operation of the subset and no indication of the identification process will be given to the calling subscriber. To attain this result, in accordance with another aspect of the invention, the induction coil switch is placed under the control of the dial off normal contacts. As is clearly understood by those skilled in the art, the dial off normal contacts are actuated by the rotation of the dial by the calling subscriber. Thus, in accordance with an aspect of the invention, dial rotation causes the induction coil to be switched to the identification circuit. This causes the identification signal generated by the transistor oscillator to be applied to the line during the off normal pull time of the dial. When the dial returns to its normal position the induction coil is switched back to the speech circuit.

In accordance with a feature of this invention, a transistor oscillator, located in a telephone set on a multiparty line, utilizes a circuit element normally present in such sets to supply calling subscriber identification signals. More specifically, it is a feature of this invention to employ the induction coil necessary for normal operation of such telephone sets as a tuning element in a party identification signal generator.

It is another feature of this invention that the induction coil be switched from its normal function in the speech circuit to the identification signal oscillator during the off normal pull of the subscriber's dial to avoid interference with the normal operation of the telephone set and to prevent the calling subscriber from receiving an indication of the identification process. More specifically, in accordance with another feature of this invention, the induction coil is switched into the identification circuit under the control of the dial off normal contacts at a time when the receiver is out of the circuit.

A complete understanding of the invention together with the above noted and other features thereof may be gained from consideration of the following detailed description and the accompanying drawing, in which.

Figure 1:
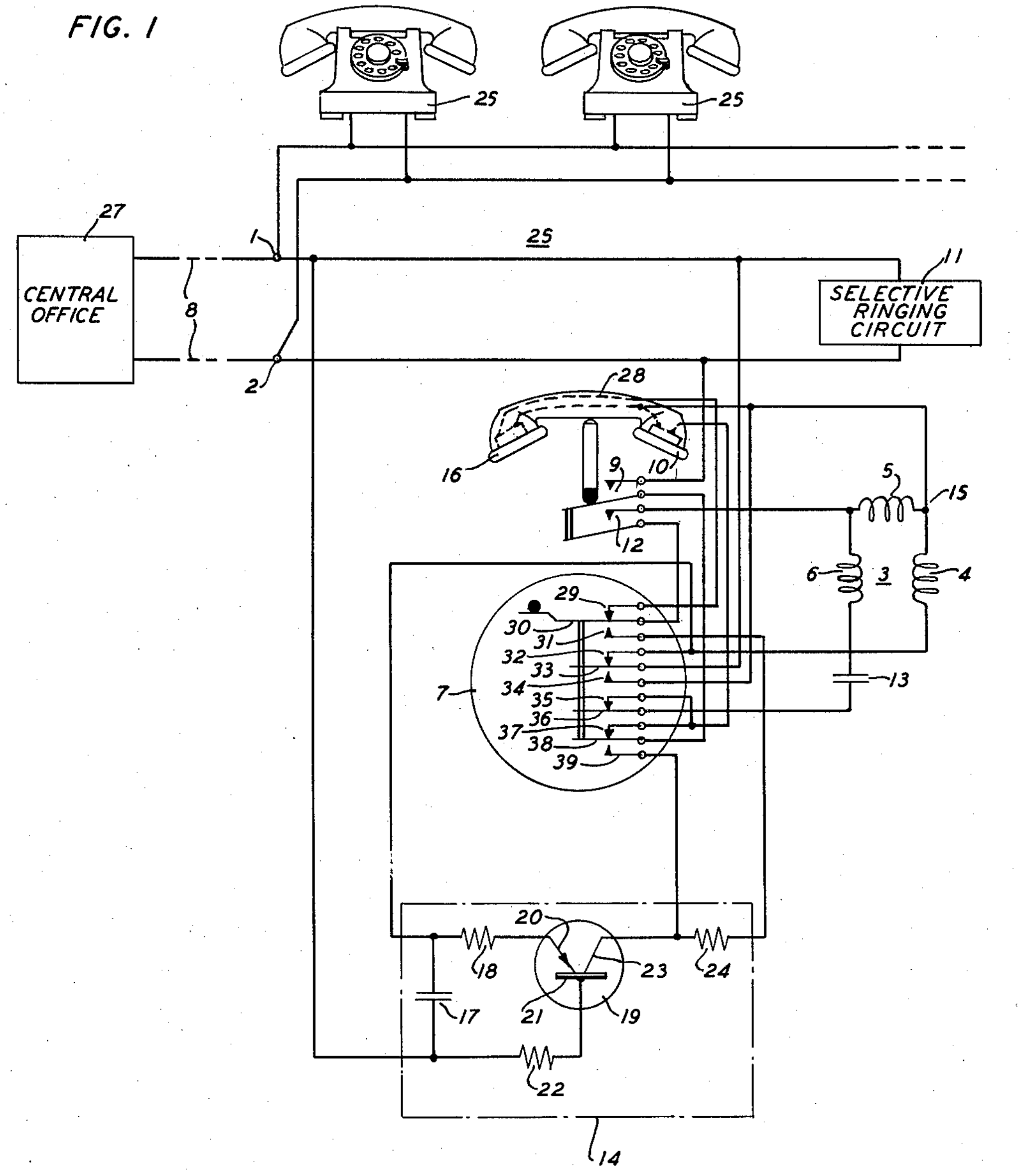
Fig. 1 is a simplified schematic representation of a telephone system in accordance with one specific embodiment of the instant invention showing particularly the transmission circuit and the identification signal oscillator in the dial normal condition of one subset of the system.

Referring now to the drawing, the telephone set shown in simplified form in Fig. 1 basically includes a type of telephone circuit well known in the art which is employed in combination with a party identification signal oscillator in accordance with one specific embodiment of the invention. It will be clearly understood by those skilled in the art that the principles of the instant invention are independent of the type of telephone set which is employed and that any one of many known types of telephone sets may be utilized in the same manner as the illustrative embodiment disclosed.

As shown by the illustrative embodiment depicted in Fig. 1 of the drawing, the line terminals 1 and 2 connect a plurality of telephone sets 25 to the central office 27 by means of the subscriber loop 8. Each telephone set on the party line is equipped with a dialing device or call transmitter 7 which comprises, inter alia, the off normal contacts 29 to 39, inclusive. Line terminal 1 is connected through the normally closed break contacts 32—33 to winding 4 of an induction coil 3 which advantageously comprises the windings 4, 5 and 6.

A transmitter 10 of the handset 28 has one terminal connected to the junction 15 of windings 4 and 5 and to contact 34 of the normally open make contacts 33—

34. The other terminal of transmitter 10 is connected to contacts 35 and 37, respectively, of the normally closed break contacts 35—36 and 37—38. Junction 15 also is connected to a terminal of the receiver 16, the other terminal of which is connected to contact 29 of the normally closed break contacts 29—30. Contact 30 is connected, when the receiver 28 is in the off hook condition, through the switchhook contact pair 12 to the junction of windings 5 and 6 of the induction coil 3. Also when the receiver is in the off hook condition line terminal 2 is connected through the switchhook contact pair 9 to contact 38. Contact 36 is connected through a capacitor 13 to a terminal of the induction coil winding 6.

The party identification oscillator 14 comprises a transistor 19 having an emitter electrode 20, a base electrode 21 and a collector electrode 23. A resistor 18 is connected to the emitter electrode 20 and a resistor 22 is connected to the base electrode 21. A capacitor 17 is connected between the resistors 18 and 22. The capacitor 17, together with the windings of the induction coil 3, comprise the tuning elements of the transistor oscillator 14. Advantageously, the value of the capacitor 17 is chosen so that each station on the party line will transmit a signal of distinctive frequency to the central office 27 to enable the calling subscriber to be properly identified whenever a call is placed. The resistor 18 is connected to the induction coil winding 4 and to contact 32 of the dial off normal contacts 32—33. Resistor 22 is connected to the line terminal 1. The collector electrode 23 is connected to contact 39 of the normally open make contacts 38—39 and further is connected through a resistance 24 to contact 31 of the normally open make contacts 30—31.

A selective ringing circuit 11, which may be any one of the many types known in the art adapted for party line signaling as, for example, that disclosed in United States Patent No. 2,532,125 to F. J. Singer et al., granted November 28, 1950, is connected across terminals 1 and 2.

It can be seen from Fig. 1 that when the dial device 7 is in the normal position the emitter electrode 20 and base electrode 21 are in circuit with each other, the path being through the emitter electrode 20, the resistor 18, the dial contacts 32—33 and the resistor 22 to the base electrode 21. The collector electrode is connected to the normally open contacts 39 and 31. Thus, the transistor oscillator 14 is rendered inactive during the time the telephone set is in the dial normal condition.

Actuation of the dial device 7 to the off normal position by the calling subscriber completes the oscillator circuit and enables the identification signal to be generated and transmitted to the central office. In the dial off normal condition, the contacts 29—30 break and disconnect the induction coil windings 5 and 6 from the receiver 16 while the contacts 30—31 make to connect these windings to resistor 24 of the oscillator unit. Contacts 32—33 break to disconnect winding 4 from the line terminal 1 and to open the circuit between the transistor emitter electrode 20 and base electrode 21. Contacts 33—34 make to connect line terminal 1 with junction 15 of the induction coil windings 4 and 5. Contacts 35—36 break to disconnect the transmitter 10 from the capacitor 13. Contacts 37—38 break to disconnect the transmitter 10 from line terminal 2 and contacts 38—39 make to connect line terminal 2 to the transistor collector electrode 23.

Figure 2:
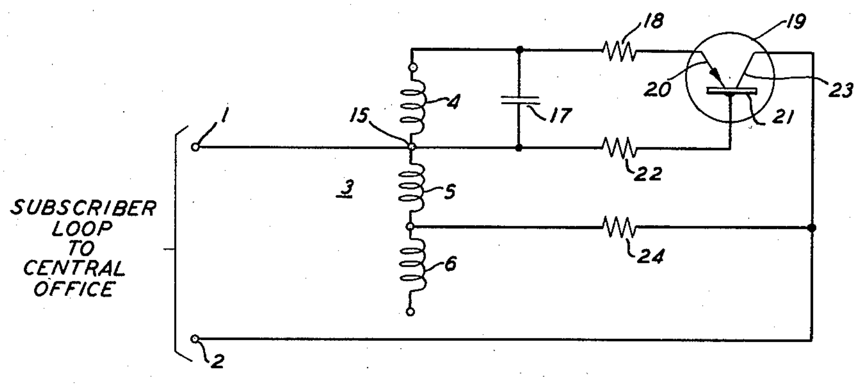
Fig. 2 is a schematic representation of the transistor oscillator circuit including the induction coil for the dial off normal condition of the telephone set of Fig. 1.

Fig. 2 depicts the completed oscillator circuit which results from the operation of the dial off normal contacts due to actuation of the dial device 7 to the off normal position. The induction coil winding 4 is connected in parallel with the capacitor 17 and further is connected through resistors 18 and 22 respectively, to the emitter electrode 20 and base electrode 21 of the transistor 19. Collector electrode 23 is connected to the resistor 24 and to the line terminal 2. Line terminal 1 is connected to the junction 15 between coil windings 4 and 5 and resistor 24 is connected to the junction between coil windings 5 and 6. Thus, in accordance with an aspect of the invention, the induction coil 3 advantageously is disconnected from its normal position in the speech circuit of the telephone set and is connected to the identification circuit to form a tuned emitter transistor oscillator with tickler winding feedback in which the coil winding 4 comprises the tuned emitter winding and the winding 5 comprises the line termination and tickler winding to the collector electrode 23.

Figure 3:
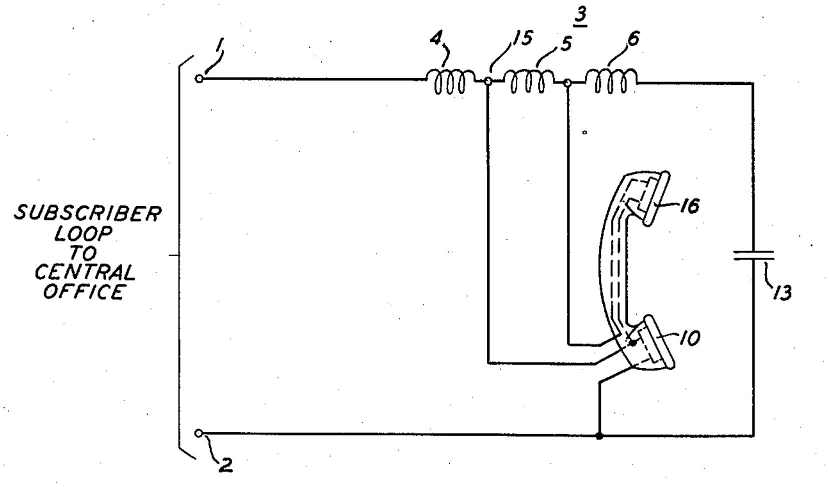
Fig. 3 is a schematic representation of the speech circuits of the telephone set of Fig. 1 for the dial normal condition.

Fig. 3 depicts the speech circuit of the telephone set of Fig. 1 for the dial normal condition. As explained heretofore, the identification oscillator is disconnected from the loop and therefore is rendered inactive by the dial off normal contacts when the dial is in this condition. As shown in Fig. 3, line terminal 1 is connected to one terminal of winding 4 of induction coil 3. The other terminal, junction 15, is connected to a terminal of the transmitter 10, the other terminal of which is connected to wire terminal 2. Junction 15 is also connected to coil winding 5, across the terminals of which is connected the receiver 16. The series combination of coil winding 6 and capacitor 13 is connected between coil winding 5 and line terminal 2. For the purpose of simplifying the disclosure the signaling apparatus has not been shown in Fig. 3. It is understood that such apparatus may readily be added to the speech circuits by those skilled in the telephone art.

In one specific embodiment of this invention wherein a Western Electric 302 type telephone set was utilized, the transistor oscillator circuit operated with satisfactory output level over loops having up to 1,000 ohms resistance at an audio frequency which remained substantially constant over the extremes of loop resistance.

Manifestly, the induction coil may be connected through the dial off normal contacts to the identification signal generator to form other types of oscillator circuits such as tuned collector oscillators and the like.

In addition to enabling the identification signal to be noninterfering with the normal operation of the telephone set, a further advantage in placing the transistor oscillator under the control of the dial off normal contacts is that the identification signal is applied steadily for the off normal pull time of each digit, giving at least one tenth of a second for identification with repeats on each digit of a normal call.

It is to be understood that the above described arrangements are illustrative of the application of the principles of the invention. Numerous other arrangements for generating a party identification signal and for controlling the transfer of the induction coil may be devised by those skilled in the art without departing from the spirit and scope of the invention.

What is claimed is:

1. In a multiparty telephone system, a central office, a plurality of subscriber stations, a line connecting each of said stations to said central office, and means at each station to transmit calling station identification signals to said central office, said means comprising dial means, induction coil means including a plurality of windings, transistor means in circuit with a condenser, and switch means responsive to the actuation of said dial means to the off normal position to connect said coil means to said transistor means to provide an oscillator circuit for generating said identification signals.

2. A station set oscillator for identifying calling parties in a multiparty telephone system comprising a transistor including base, emitter and collector electrodes, capacitance means connected to said transistor, inductance means normally not in circuit with said transistor whereby said oscillator is inactive, and switch means responsive to the actuation of a call transmitter to its off normal condition for connecting said inductance means to said transistor.

3. An oscillator for identifying calling parties in a multiparty telephone system in accordance with claim 2 wherein said inductance means comprises an induction coil normally connected in the speech circuit of the station set.

4. A telephone station for use in a multiparty telephone system comprising a calling dial, an oscillator including capacitance means and a transistor connected to said capacitance means, inductance means normally connected in the speech circuit, and switching means controlled by the actuation of said calling dial to its off normal position for disconnecting said inductance means from said speech circuit and for connecting it to said transistor to enable said oscillator to generate a party identification signal.

5. A telephone station for use in a multiparty telephone system in accordance with claim 4 wherein said switching means comprises a plurality of dial off normal contacts.

6. A telephone station for use in a multiparty telephone system in accordance with claim 4 wherein said switching means reconnects said inductance means to its normal position in the speech circuit when said calling dial returns to its normal position.

7. A station set for use in multiparty telephone systems comprising a receiver, a transmitter, an identification oscillator, an induction coil, a call transmitter, and switching means to connect said induction coil to said receiver and transmitter during the period in which said call transmitter is in its normal condition and to said identification oscillator during the period in which said call transmitter is in its off normal condition.

8. A station set for use in multiparty telephone systems in accordance with claim 7 wherein said identification oscillator comprises a transistor.

9. A station set for use in multiparty telephone systems in accordance with claim 7 wherein said switching means comprises a plurality of off normal contacts, said induction coil being connected to said receiver and transmitter by said contacts when said call transmitter is in its normal condition and being connected to said identification oscillator by said contacts when said call transmitter is in its off normal condition.

References Cited in the file of this patent

UNITED STATES PATENTS

| | | |
|---|---|---|
| 1,864,524 | Bragg | June 28, 1932 |
| 2,228,113 | Hersey | Jan. 7, 1941 |
| 2,717,279 | Matlack et al. | Sept. 6, 1955 |
| 2,729,703 | Faulkner et al. | Jan. 3, 1956 |
| 2,782,259 | Dimond | Feb. 19, 1957 |
| 2,889,410 | Hatton | June 2, 1959 |